United States Patent
Kurzweil et al.

(10) Patent No.: US 9,218,680 B2
(45) Date of Patent: Dec. 22, 2015

(54) SYSTEMS AND METHODS FOR RENDERING GRAPHICAL CONTENT AND GLYPHS

(75) Inventors: Raymond C. Kurzweil, Newton, MA (US); Paul Albrecht, Bedford, MA (US); Peter Chapman, Bedford, MA (US); Jeff Brewer, Wellesley, MA (US)

(73) Assignee: K-NFB Reading Technology, Inc., Newton, MA (US)

( * ) Notice: Subject to any disclaimer, the term of this patent is extended or adjusted under 35 U.S.C. 154(b) by 281 days.

(21) Appl. No.: 13/222,594

(22) Filed: Aug. 31, 2011

(65) Prior Publication Data

US 2012/0050306 A1 Mar. 1, 2012

Related U.S. Application Data

(60) Provisional application No. 61/379,097, filed on Sep. 1, 2010.

(51) Int. Cl.
*G09G 5/00* (2006.01)
*G06T 11/60* (2006.01)

(52) U.S. Cl.
CPC ...................... *G06T 11/60* (2013.01)

(58) Field of Classification Search
USPC .................................. 345/629, 636
See application file for complete search history.

(56) References Cited

U.S. PATENT DOCUMENTS

| | | | |
|---|---|---|---|
| 5,724,494 A * | 3/1998 | Politis | 345/592 |
| 5,745,121 A * | 4/1998 | Politis | 345/619 |
| 6,014,147 A * | 1/2000 | Politis et al. | 345/620 |
| 6,415,307 B2 | 7/2002 | Jones et al. | |
| 6,973,213 B2 * | 12/2005 | Fan et al. | 382/176 |
| 7,139,004 B2 * | 11/2006 | Saund et al. | 345/582 |
| 7,155,068 B2 * | 12/2006 | Zhang et al. | 382/284 |
| 7,278,117 B2 * | 10/2007 | Gargi | 715/864 |
| 7,450,268 B2 | 11/2008 | Martinez et al. | |
| 7,453,472 B2 | 11/2008 | Goede et al. | |
| 7,593,138 B2 | 9/2009 | Barnes | |
| 7,667,863 B1 | 2/2010 | Eldred et al. | |
| 7,701,458 B2 * | 4/2010 | Sahuc et al. | 345/471 |
| 7,742,192 B2 * | 6/2010 | Furuya | 358/1.9 |
| 7,765,477 B1 | 7/2010 | Dash | |
| 7,787,712 B2 | 8/2010 | Takahashi et al. | |
| 8,014,560 B2 | 9/2011 | Nafarieh et al. | |
| 8,024,655 B2 * | 9/2011 | Martin et al. | 715/276 |
| 8,028,231 B2 | 9/2011 | Jeffery et al. | |
| 8,045,204 B2 | 10/2011 | Henry et al. | |
| 8,471,867 B2 * | 6/2013 | Rajagopalan | 345/620 |
| 2002/0191202 A1 * | 12/2002 | Furuya | 358/1.9 |
| 2003/0142106 A1 * | 7/2003 | Saund et al. | 345/582 |
| 2005/0076295 A1 * | 4/2005 | Simske et al. | 715/517 |
| 2006/0177151 A1 * | 8/2006 | Miyazawa et al. | 382/298 |
| 2007/0271288 A1 * | 11/2007 | Martin et al. | 707/101 |
| 2007/0272188 A1 * | 11/2007 | Geyer et al. | 123/179.16 |
| 2008/0181496 A1 * | 7/2008 | Ferman et al. | 382/168 |
| 2008/0304113 A1 | 12/2008 | Curry et al. | |
| 2009/0109479 A1 | 4/2009 | Kato | |
| 2009/0110319 A1 * | 4/2009 | Campbell et al. | 382/260 |
| 2010/0007915 A1 | 1/2010 | Ogino et al. | |
| 2010/0172590 A1 | 7/2010 | Foehr et al. | |
| 2010/0174985 A1 * | 7/2010 | Levy et al. | 715/244 |
| 2011/0010645 A1 | 1/2011 | Mihalcea | |
| 2011/0035289 A1 | 2/2011 | King et al. | |

* cited by examiner

*Primary Examiner* — M Good Johnson
(74) *Attorney, Agent, or Firm* — Fish & Richardson P.C.

(57) ABSTRACT

Disclosed are techniques and systems for rendering pages or documents with both graphical and textual content.

24 Claims, 6 Drawing Sheets

SYSTEMS AND METHODS FOR RENDERING GRAPHICAL CONTENT AND GLYPHS

This application claims priority from and incorporates herein by reference in its entirety U.S. Provisional Application No. 61/379,097, filed Sep. 1, 2010, and titled: "SYSTEMS AND METHODS FOR RENDERING GRAPHICAL CONTENT AND GLYPHS."

BACKGROUND

Webpages and documents often include both glyph-based (e.g., textual) and graphical components that are combined when rendered on a viewable display. The amount of time it takes for the webpage or display to load, e.g., to be viewable on the screen, can depend on the format and size of the contents of the document or page.

SUMMARY

This invention relates generally to techniques for rendering pages with both graphical and glyph-based (e.g., text-based, character-based, or symbol-based) content. The techniques can improve performance of rendered pages by converting graphical content to an image while preserving the glyph-based content.

To convert graphical content to an image while preserving the glyph-based content, the techniques described herein locate and hide all the glyph-based content (e.g., hide all of the glyphs such as letters, numbers, and characters) and produce an image from remaining components of the page including all of the graphical content for the page. The image provides a background onto which the glyphs can be overlaid because the glyphs are not included in the image. Because the glyphs are overlaid (e.g., presented in a higher level layer of the page), any glyphs that were originally not visible on the rendered page are excluded from the subset of overlaid glyphs. The techniques determine which of the glyphs included in the original page were visible (e.g., not obscured by other content such as graphics) and removes all glyphs or characters that are not visible (e.g., that were hidden by other images or graphics). Only those glyphs that are visible are rendered on the page with the background image.

Various approaches can be used to determine which glyphs are visible on the originally rendered page. In one exemplary approach, the font color of all glyphs is changed to a first color, an image of the page is generated (e.g., a bitmap image). The font color of all glyphs is changed to a second color and a second image of the page (e.g., a second bitmap image) is generated. By comparing the images to see where they differ, any areas where the color of the pixels has changed corresponds to visible glyphs while glyphs or glyph characters where the color has not changed are not visible and are removed or hidden.

In some aspects, a computer-implemented method includes determining portions of a page that include glyphs, generating by a computer an image that includes non-glyph portions of the page by converting graphical content associated with the page into an image, classifying by the computer the glyphs into visible glyphs and non-visible glyphs, removing by the computer the non-visible glyphs, and overlaying by the computer the visible glyphs on the image of the non-glyph portions of the page when rendering the page.

In other aspects, a system includes one or more processors configured to determine portions of a page that include glyphs, generate an image that includes non-glyph portions of the page by converting graphical content associated with the page into an image, classify the glyphs into visible glyphs and non-visible glyphs, remove the non-visible glyphs and overlay the visible glyphs on the image of the non-glyph portions of the page when rendering the page.

In still other aspects, a computer program product tangibly embodied in a computer readable device includes instructions to cause a processor to determine portions of a page that include glyphs, generate an image that includes non-glyph portions of the page by converting graphical content associated with the page into an image, classify the glyphs into visible glyphs and non-visible glyphs, remove the non-visible glyphs and overlay the visible glyphs on the image of the non-glyph portions of the page when rendering the page.

In still other aspects, a method includes determining portions of a page that include glyphs. The method also includes classifying the glyphs into visible glyphs and non-visible glyphs by changing a property associated with at least one of the glyphs to a first value, generating a first image of the page based on the first value of the property, changing the property of at least one of the all glyphs to a second, different value, generating a second image of the page based on the second value of the property, and comparing the first and second images to detect differences in the property of the glyphs between the first and the second images.

Embodiments can include one or more of the following.

The image can be a bitmap. Classifying the glyphs can include determining if a glyph is hidden by an image or graphic. Classifying the glyphs can include changing a property associated with all glyphs to a first value, generating a first image of the page based on the first value of the property, changing the property of all glyphs to a second, different value, generating a second image of the page based on the second value of the property, and comparing the first and second images to detect differences in the property of the glyphs between the first and the second images. Classifying the glyphs can include changing the color of all glyphs to a first color, generating a first image of the page, changing the color of all glyphs to a second color, generating a second image of the page, and comparing the first and second images to detect differences in the colors of the glyphs between the first and the second images. Comparing the first and second images can include determining portions where the first and second images differ. The method can also include using speech-to-text processing to generate an audio output of the visible glyphs.

DETAILED DESCRIPTION

Figure 1:
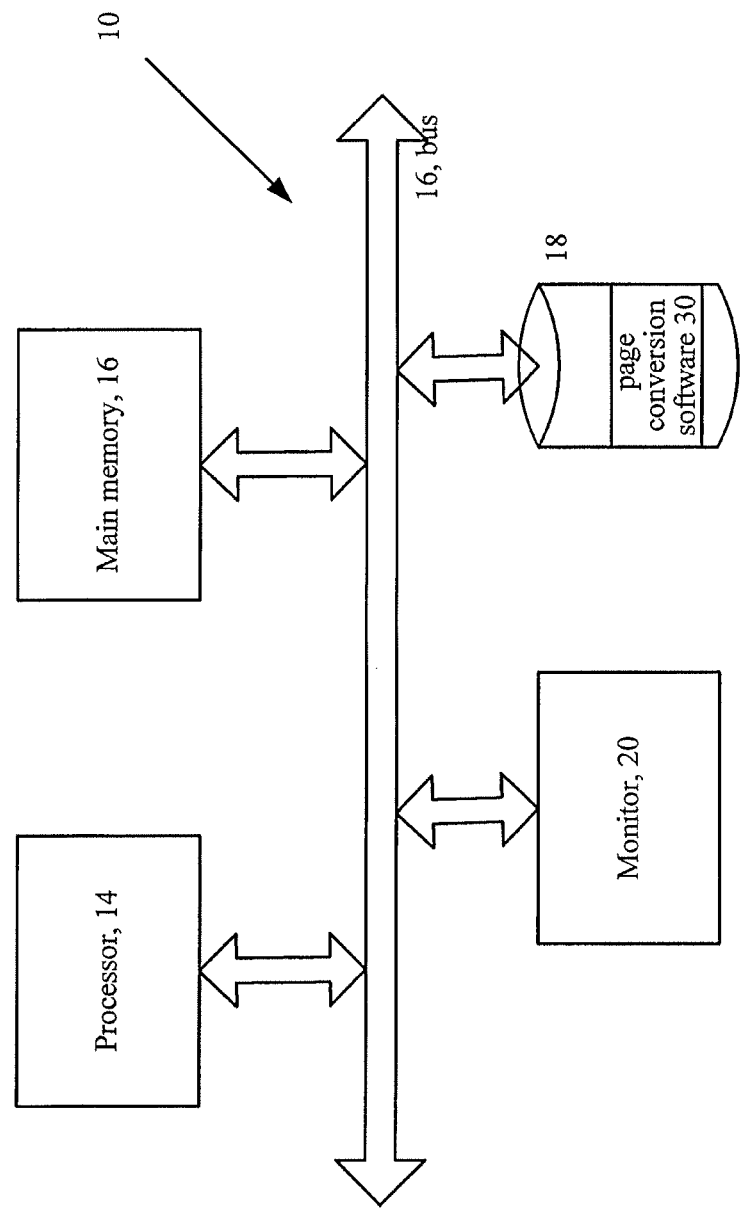
FIG. 1 is a block diagram of a system.

Referring now to FIG. 1, a system 10 for generating and rendering pages with both graphical and glyph-based content is shown. The system improves performance of rendered pages, e.g., the speed at which the page loads, by converting graphical content to an image while preserving glyph-based content such as letters, numbers, or other characters that exist in the image. The system 10 includes a computer system 12. The computer system 12 is generally a personal computer or can alternatively be another type of computing device (e.g., a server, a cellular phone that includes a processor, a handheld computer, a camera, an electronic book reader, etc.) and typically includes a processor 14. In some examples, the processor 14 can be a Pentium based system from Intel Corporation, Santa Clara, Calif., although other processors could alternatively be used. In addition, to the processor 14, the computer system 12 includes main memory, 16 cache memory and bus interface circuits (not shown). The computer system 12 includes a mass storage element 18, here typically the hard drive associated with personal computer systems.

The system 10 can also include a standard PC type keyboard (not shown), a standard monitor 20 as well as speakers (not shown), a sound card (not shown), a pointing device such as a mouse (not shown) all coupled to various ports of the computer system 12 via appropriate interfaces and software drivers (not shown) and a system bus 19. The computer system 12 here operates under a Windows Microsoft Corporation operating system although other systems could alternatively be used.

Resident on the mass storage element 16 is page conversion software 30 (described in FIG. 2) that generates pages with both graphical and glyph-based (e.g., textual) content in a format that improves rendering of the pages. For example, pages such as XAML pages or PDF based pages include a large amount of content that can take a long time to render. The page conversion software 30 generates an image that includes all of the graphical content (e.g., as opposed to multiple separate images) in a file type that can be easily and quickly rendered such as a bitmap or tiff image. The conversion software 30 overlays any previously visible text (and excludes previously non-visible text, if any) onto the image of the graphical content. Other content on the original page, such as videos, can be preserved in the content's original format.

Figure 2:
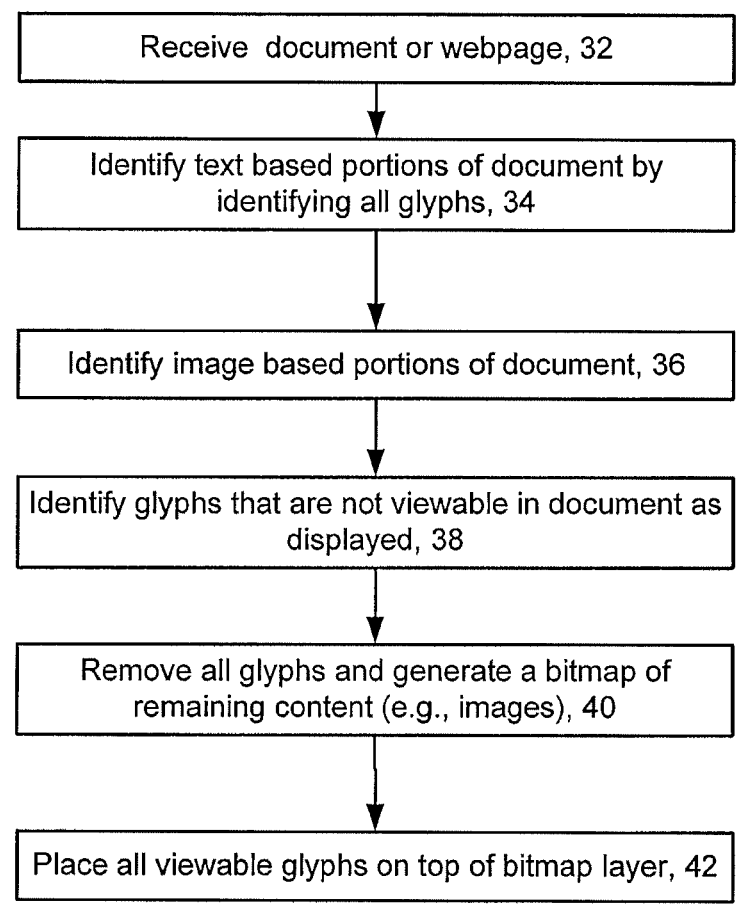
FIG. 2 is a flowchart of generating a viewable display.

Referring now to FIG. 2 details of the page conversion software 30 for converting a webpage or other document into a format that can be more quickly rendered is shown. The page conversion software 30 receives 32 a document or webpage that includes both graphical and glyph-based (e.g., textual) portions. The document or page can be in various formats such as XML or other programming languages. The graphical and glyph-based portions can be included in multiple different layers that are combined to render the complete document or page. The page conversion software 30 identifies 34 glyph-based portions of the document of webpage.

As used herein a glyph is a term used to define an element of writing such as text, e.g., individual marks or markings on a written document that contributes to the meaning of what is written on the document. Excluded from the definition of a glyph are images and graphical content (non-limiting examples of which include graphs, pictures, charts, etc.) that are not used to form text. For example, the system identifies all of the glyphs included in each of the layer(s) that are combined to render the page. The glyphs include any letters, numbers, or symbols included in a written language (e.g., English letters and numbers, Chinese characters, etc). The system also identifies 36 all image based portions of the document. That is, portions of the document that include pixels that are not used to form glyphs can be identified as graphical content. In identifying the graphical portions, the system excludes executable files such as videos and/or sound files.

Due to stacking of multiple layers that are combined when rendering a complete page or document, it is possible that some glyphs included in the layers are not displayed in the rendered document or page. In order to insure that an image that is generated is consistent with the image of the originally viewable document or page, the page conversion software 30 identifies 38 glyphs that are included in the document or page that are not viewable when the document is rendered. Identifying the glyphs that are included in the document or page that are not viewable can also be beneficial in applications in which text-to-speech processes are used to read out loud the text displayed on a page or document to ensure that only the text that is visible is read out loud during the text-to-speech process. In some additional examples, identifying the glyphs that are included in the document or page that are not viewable can also be beneficial in applications in which a word search of a document is performed to ensure that only the text that is visible is included in the search.

Various techniques that are executed on a processor in a computer system can be used to identify the portions of glyph-based content that are/are not viewable in the rendered image. One technique uses hit testing to determine whether the pixel associated with the glyph is the first pixel encountered from front to back in the layers of the image. If another pixel is "hit" prior to reaching the glyph pixel, then the system determines that the glyph pixel is not viewable in the final document or page. In another technique, a comparison of two rendered pages can be used to determine what glyphs are rendered in the document or page. For example, the page conversion software 30 generates two different renderings of the page or document with the font color of all glyphs is changed between the two renderings such that the font color is different between the two pages. By comparing the rendered images to see where the two images differ, the page conversion software 30 determines what glyphs are viewable by classifying areas where a color change is observed as including visible glyphs. In some examples, a portion of less than the entire page can be converted into an image and analyzed to see where the color change is observed. For example, a character-by-character or pixel-by-pixel comparison could be implemented.

In order to generate a document of page that can be quickly rendered, the page conversion software 30 reduces the total size of the graphical content by removing 40 all glyphs and generating a bitmap (or other image file) of the remaining content. Generating a single image of the remaining content (e.g., the graphical or non-glyph content), reduces the total size of the file used to render the graphical content and can enable the page to be rendered quicker than having the page rendered directly from the XML form. In some examples, generating the bitmap or other image file can include changing the format of the image from a higher resolution image to a lower resolution image. In order to display the glyphs in addition to the graphical content, the page conversion software 30 places 42 all glyphs that are viewable in a layer that is overlaid on top of the bitmap when rendered. As such, the layers of the page or document are reduced to a single bitmap or other image file that includes all of the graphical content and a layer that includes all of the glyphs that is overlaid onto the graphical content layer. In some examples, an additional layer can include executable files such as videos.

In order to correctly align the glyphs with the image or bitmap of the graphical components, the glyphs are associated with positional and size information that associates the glyph elements to respective locations in the image representation of the document as displayed on the display device. Information related to formatting such as font style, font color, background color, font size, and so forth for each of the glyphs can also be stored such that the glyphs are rendered in the same format as in the original page or document.

Figure 3B:
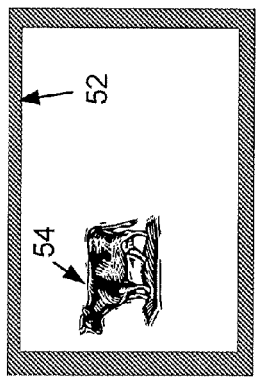
FIGS. 3A-3D show exemplary portions of a document or page.
Figure 3C:
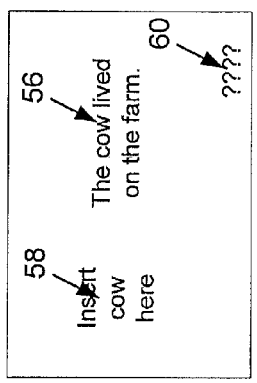
Figure 3D:
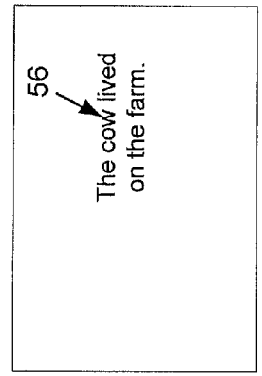
Figure 3A:
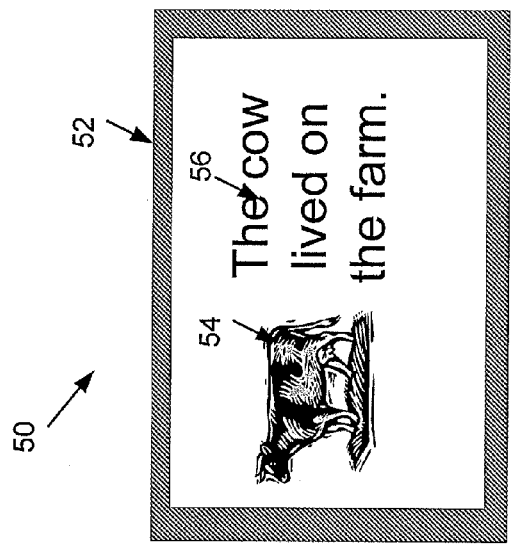

FIG. 3A shows an exemplary rendered document or page 50. The rendered document or page 50 includes visible non-glyph based portions and glyph-based portions. In this exemplary page, the non-glyph based items include a graphic of a cow 54 and a page border 52. The glyph based portions include both visible and non-visible portions. The visible glyph-based portions are the words "The cow lived on the farm." While the rendering of the document or page includes only one portion of visible text—"The cow lived on the farm"—other glyphs are included in the document that are not visible because the glyphs are obscured by the graphical content (e.g., glyphs 58 and 60 as shown in FIG. 3C).

The page conversion software 30 identifies the glyph-based portions of the document of webpage. The identified glyph-based portions include both the visible and the non-visible glyphs. As shown in FIG. 3C, the identified glyphs include both the glyphs that are displayed in the rendered document (e.g., glyphs 56) and the glyphs that are not visible in the rendered document (e.g., glyphs 58 and 60). In this example, the glyphs 58 and 60 are obscured by the graphic of the cow 54 and the page border 52, respectively. The system also identifies all image based portions of the document.

As shown in FIG. 3B, the graphical portions of the document or page include the graphic of the cow 54 and the page border 52. The page conversion software 30 generates a bitmap (or other image file) of the remaining graphical portions (e.g., the portions shown in FIG. 3B) by removing all glyph based portions and generating a single image of the remaining content.

The page conversion software 30 determines which of the glyphs are visible (e.g., the glyphs shown in FIG. 3D) and stores the glyphs that are viewable in a layer to be displayed on top of the bitmap. As such, the layers of the page or document are reduced to a single bitmap or other image file that includes all of the graphical content (e.g., as shown in FIG. 3B) and a layer that includes all of the glyphs that is overlaid onto the graphical content layer (e.g., as shown in FIG. 3D).

Figure 4:
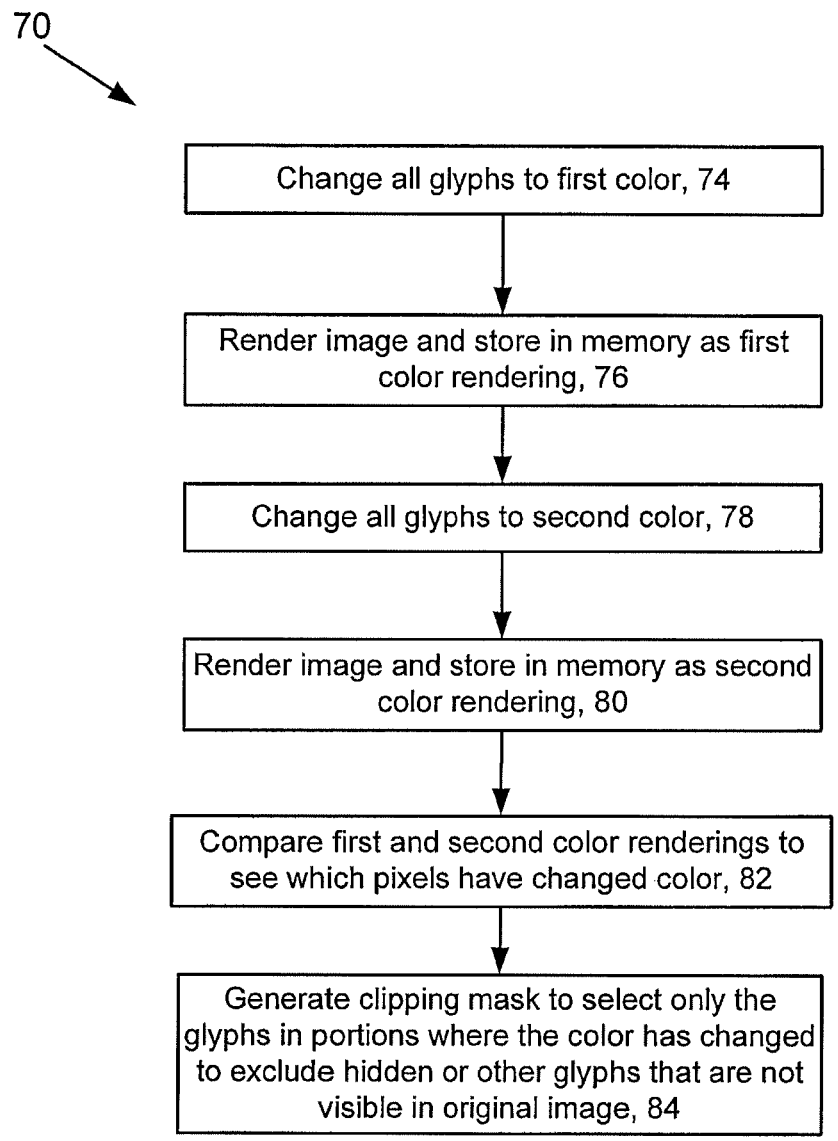
FIG. 4 is a flowchart of a process for determining glyphs that are viewable on a rendered document or page.

FIG. 4 shows a process 70 for determining which portion of the glyphs included in a page or document are visible in the rendered document using a color property of the glyphs. The process includes determining the portions of the document or page that include glyphs by locating each of the glyphs included in the various layers of the page that are combined to generate the rendered document or page. The page conversion software 30 changes 74 all of the glyphs to a first color. The page conversion software 30 generates 75 a rendering of the complete page or document (e.g., the glyphs plus any other content). The rendered image is stored 76 in a memory associated with the computer system as first glyph color rendering. The page conversion software 30 changes 78 all of the glyphs to a second color that is different from the first color, renders 79 the complete page or document (e.g., the glyphs plus any other content) and stores 80 the rendered page as a second glyph color rendering. For example, if the first color is red and the second color is black, regardless of the original font colors of the glyphs in the page or document, the first color rendering will include all glyphs in red font and the second color rendering will include all glyphs in black font. The page conversion software 30 compares 82 the first and second color renderings to determine which portions (e.g., which pixels) have changed color. As some portions of the glyphs may be obscured in the rendered document by graphics or other content, while all of the glyphs (including the obscured glyphs) will have changed colors between the two renderings, only the portions of the glyphs that are visible will be seen as a changed color in the rendered pages. The glyphs that are hidden will have no visual effect due to the stacking order of the multiple layers and, thus, will not be seen a portion where a color change has occurred because the color of that portion will remain as the color of the higher level layer. After identifying the visible glyphs, the page conversion software 30 generates a clipping mask to select the portions where the color has changed (e.g., the visible glyphs). By selecting only the portions where there was a visible color change, any obscured glyphs or otherwise non-visible glyphs will not be included in the clipping mask.

Figure 5A:
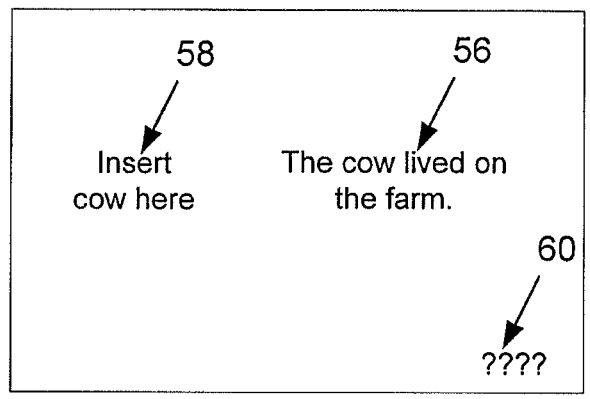
FIGS. 5A-5E show exemplary portions of a document or page.
Figure 5B:
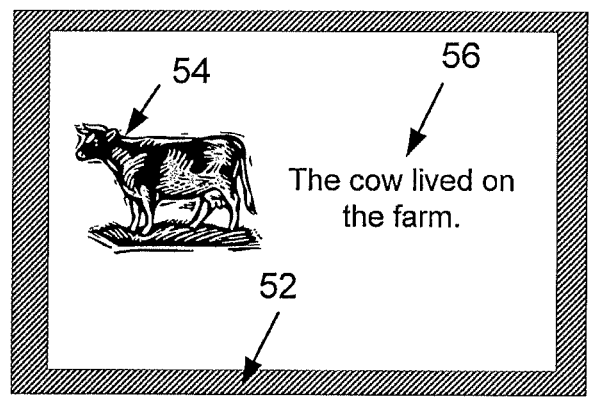
Figure 5C:
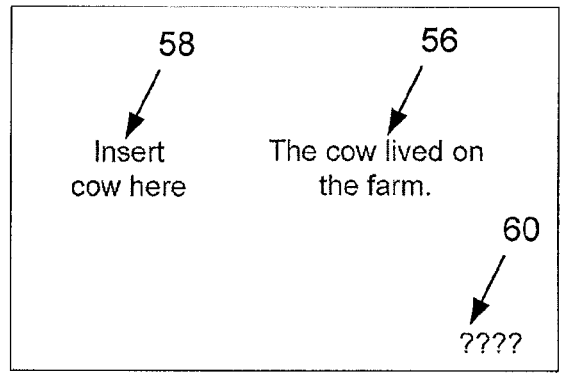
Figure 5D:
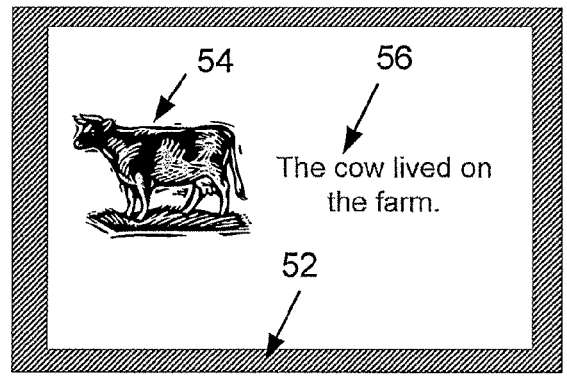
Figure 5E:
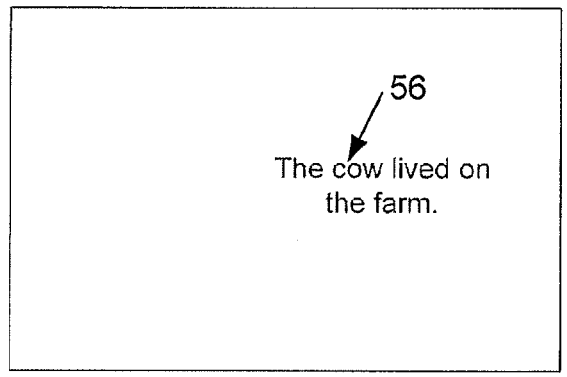

FIGS. 5A-5E shows an example of the glyphs and the rendered documents using the above described page conversion software 30 to identify the visible glyphs. As shown in FIG. 5A, the glyphs (both the visible 56, and non-visible portions 58 and 60) are changed to a first color (here the color is black). As shown in FIG. 5B, in a rendered image, only the portion 56 is visible and displayed in black font because portions 58 and 60 are obscured by the images of the cow and page border, respectively. As shown in FIG. 5C, the glyphs (both the visible 56 and non-visible portions 58 and 60) are changed to a second color (here the color is grey). As shown in FIG. 5D, in a rendered image using the font of the second color, only the portion 56 is visible and displayed in grey font. When the rendered images (e.g., the images shown in FIGS. 5B and 5D) are compared, the color of the pixels in the two images changes only where the glyphs are visible. While the glyphs 58 and 60 changed colors between the rendered images, this color change is not evident in the displayed image because the glyphs are obscured by the image of the cow 54 and the border 52. As such, when selecting glyphs to overlay onto an image that includes all of the graphical elements, only the glyphs in portions where the color change was observed will be selected (e.g., as shown in FIG. 5E).

In some embodiments, text-to-speech processes are used to read out loud the text displayed on a page or document. Optical character recognition is performed on the text that is clipped for display after the non-visible text is removed. Thus, only the text that is visible and should be spoken is included. Thus, non-visible glyphs from the original document are not read out loud during the text-to-speech process.

In some embodiments, searching software or algorithms are used to perform a word search on the text displayed on a page or document. Optical character recognition is performed on the text that is clipped for display after the non-visible text is removed. Thus, only the text that is visible and should be included in the search. Thus, non-visible glyphs from the original document are not included in the search results.

In some embodiments, glyphs can be partially obscured by transparent or semi-transparent overlying images. As noted above, in generating a page that is more quickly viewable, glyphs that are viewable are placed in a layer that is overlaid on top of the bitmap when rendered. These glyphs would include glyphs that are partially obscured by transparent or semi-transparent overlying images assuming that the glyphs are still visible in the original document. As such, the layers of the page or document are reduced to a single bitmap or other image file that includes all of the graphical content and a layer that includes all of the glyphs that is overlaid onto the graphical content layer. Because the glyphs are overlaid in a layer above the images, the formatting of the font is altered to have the same appearance as in the original document. For example, the font can be partially blurred or the color of the font can be adjusted to create the illusion that the image overlays the font.

The systems and methods described herein can be implemented in digital electronic circuitry, or in computer hardware, firmware, software, web-enabled applications, or in combinations thereof. Data structures used to represent information can be stored in memory and in persistence storage. Apparatus of the invention can be implemented in a computer program product tangibly embodied in a machine-readable storage device for execution by a programmable processor and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired, and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files, such devices include magnetic disks, such as internal hard disks and removable disks magneto-optical disks and optical disks. Storage devices suitable for tangibly embodying computer program instructions and data include all forms of memory, non-volatile and volatile and including, by way of example, semiconductor memory devices, such as EPROM, EEPROM, and flash memory devices; magnetic disks such as, internal hard disks and removable disks; magneto-optical disks; and CD_ROM disks. Any of the foregoing can be supplemented by, or incorporated in, ASICs (application-specific integrated circuits).

Other implementations are within the scope of the following claims: For example, other properties of the text could be used. For example, an image with the text in the original color could be compared to an image of the page with all text removed. Additionally, other properties could include font style or type or type face or color could changed between renderings, albeit using such properties could require modifications to the software used to identify the glyphs as the pixels forming the glyphs could change. For example, rather than using a pixel by pixel comparison, the general areas in which changes are identified could be identified as including text and a character recognition program could locate the characters within those regions. In some additional examples, in order to identify the glyphs, the system can recolor all images to a single color (white or black) without changing transparencies of the elements and compare the recolored image to the original image. In some additional examples, in order to identify the glyphs, the system can use multiple colors (or hues) in a single rendering pass to identify which glyphs are missing and which are visible. In such examples, the change in the hue of the glyphs will cause each glyph to differ from the original image such that the glyphs can be identified by a comparison of the rendering with the original image.

What is claimed is:

1. A computer-implemented method, comprising:
    determining by the computer portions of a page that include glyphs, where glyphs are text-based, character-based, or symbol-based content, and where glyphs exclude graphic-based content;
    generating by the computer an image of the page that has only non-glyph graphical content in the image;
    classifying the glyphs into visible glyphs and non-visible glyphs;
    removing by the computer the non-visible glyphs; and
    rendering the image of the page, with the visible glyphs rendered as an overlay on the image of the page.

2. The method of claim 1, wherein rendering the visible glyphs as an overlay on the image of the page when rendering the page comprises aligning by the computer the visible glyphs with the image of the non-glyph portions of the page when rendering the page, based on with positional and size information that associates the glyph elements to respective locations in the image representation of the document as rendered by a device that renders the image of the page with the visible glyphs.

3. The method of claim 1, wherein the image is a bitmap.

4. The method of claim 1, wherein classifying the glyphs comprises determining if a glyph is hidden by an image or graphic.

5. The method of claim 1, wherein classifying the glyphs comprises:
    changing a property associated with at least one of the glyphs to a first value;
    generating a first image of the page based on the first value of the property;
    changing the property of at least one of the glyphs to a second, different value;
    generating a second image of the page based on the second value of the property; and
    comparing the first and second images to detect differences in the property of the glyphs between the first and the second images.

6. The method of claim 1, wherein classifying the glyphs comprises:
    changing a property associated with all of the glyphs to a first value;
    generating a first image of the page based on the first value of the property;
    changing the property of all glyphs to a second, different value;
    generating a second image of the page based on the second value of the property; and
    comparing the first and second images to detect differences in the property of the glyphs between the first and the second images.

7. The method of claim 1, wherein classifying the glyphs comprises:
    changing the color of all glyphs to a first color;
    generating a first image of the page;
    changing the color of all glyphs to a second color;
    generating a second image of the page; and
    comparing the first and second images to detect differences in the colors of the glyphs between the first and the second images.

8. The method of claim 7, wherein comparing the first and second images comprises determining portions where the first and second images differ.

9. The method of claim 1, further comprising using speech-to-text processing to generate an audio output of the visible glyphs.

10. A system, comprising:
    one or more processors configured to:
    determine portions of a page that includes glyphs, where glyphs are text-based, character-based, or symbol-based content, and where glyphs exclude graphic content;
    generate a single image of the page that has only all non-glyph graphical content in the image;

classify the glyphs into visible glyphs and non-visible glyphs;
remove the non-visible glyphs; and
overlay the visible glyphs on top of the image when rendering the page.

11. The system of claim 10, wherein the image is a bitmap.

12. The system of claim 10, wherein the configurations to classify the glyphs comprise configurations to determine if a glyph is hidden by an image or graphic.

13. The system of claim 10, wherein the configurations to classify the glyphs comprise configurations to:
change a property associated with all glyphs to a first value;
generate a first image of the page based on the first value of the property;
change the property of all glyphs to a second, different value;
generate a second image of the page based on the second value of the property; and
compare the first and second images to detect differences in the property of the glyphs between the first and the second images.

14. The system of claim 10, wherein the configurations to classify the glyphs comprise configurations to:
change the color of all glyphs to a first color;
generate a first image of the page;
change the color of all glyphs to a second color;
generate a second image of the page; and
compare the first and second images to detect differences in the colors of the glyphs between the first and the second images.

15. The system of claim 10, further comprising a speech-to-text unit configured to use speech-to-text processing to generate an audio output of the visible glyphs.

16. A computer program product tangibly stored in a computer readable hardware storage device, the computer program product comprising instructions to cause a processor to:
determine portions of a page that include glyphs, where glyphs are text-based, character-based, or symbol-based content, and where glyphs exclude graphic content;
generate an image of the page that has only non-glyph graphical content associated in the image;
classify the glyphs into visible glyphs and non-visible glyphs;
remove the non-visible glyphs; and
overlay the visible glyphs on top of the image when rendering the page.

17. The computer program product of claim 16, wherein the instructions to classify the glyphs comprise instructions to determine if a glyph is hidden by an image or graphic.

18. The computer program product of claim 16, wherein the instructions to classify the glyphs comprise instructions to:
change a property associated with all glyphs to a first value;
generate a first image of the page based on the first value of the property;
change the property of all glyphs to a second, different value;
generate a second image of the page based on the second value of the property; and
compare the first and second images to detect differences in the property of the glyphs between the first and the second images.

19. The computer program product of claim 16, wherein the instructions to classify the glyphs comprise instructions to:
change the color of all glyphs to a first color;
generate a first image of the page;
change the color of all glyphs to a second color;
generate a second image of the page; and
compare the first and second images to detect differences in the colors of the glyphs between the first and the second images.

20. A computer implemented method, the method comprising:
determining by a computer portions of a page that include glyphs, where glyphs are text-based, character-based, or symbol-based content and exclude graphic content;
classifying by the computer the glyphs into visible glyphs and non-visible glyphs by:
changing by the computer a property associated with at least one of the glyphs to a first value;
generating by the computer a first image of the page based on the first value of the property;
changing by the computer the property of at least one of the all glyphs to a second, different value;
generating by the computer a second image of the page based on the second value of the property; and
comparing by the computer the first and second images to detect differences in the property of the glyphs between the first and the second images.

21. The method of claim 20, wherein:
changing a property associated with at least one of the glyphs to a first value comprises changing a property associated with all of the glyphs to the first value; and
changing the property of at least one of the all glyphs to a second, different value comprises changing the property of all glyphs to the second, different value.

22. The method of claim 20, wherein:
changing a property associated with at least one of the glyphs to a first value comprises changing the color of at least one of the glyphs to a first color;
changing the property of at least one of the all glyphs to a second, different value comprises changing the color of at least one of the glyphs to a second.

23. The method of claim 20, wherein comparing the first and second images comprises determining portions where the first and second images differ.

24. The method of claim 20, further comprising using speech-to-text processing to generate an audio output of the visible glyphs.

* * * * *